Patented Feb. 5, 1946

2,394,370

UNITED STATES PATENT OFFICE 2,394,370

TREATMENT OF CELLULOSE

Robert B. Darling, Hopewell, Va., assignor to Hercules Powder Company, Wilmington, Del., a corporation of Delaware No Drawing. Application May 12, 1945, Serial No. 593,539

6 Claims. (Cl. 260—229)

This invention relates to an improved process for the preparation of purified cellulose. More particularly, it relates to a process for the preparation of stabilized purified cotton linters capable of imparting improved properties to organic acid esters of cellulose prepared therefrom.

The properties of chemical cellulose are affected to a large extent by certain constituents adsorbed from the processing water used in its purification. The presence of calcium, for example, increases the heat stability of chemical cellulose and also of cellulose esters, such as the acetate prepared therefrom, but results in the formation of haze in such cellulose esters. The presence of sodium, on the other hand, retards such haze formation but causes loss of stability and reactivity of the cellulose.

The use of natural water as from wells, springs, rivers, lakes, etc., for processing chemical cellulose has, for this reason, proved disadvantageous due to the contained calcium hardness in the form of carbonates, sulfates, and chlorides. Removal of the calcium hardness as by treatment with sodium zeolite which replaces calcium by sodium, has not proved entirely satisfactory since the presence of sodium decreases heat stability. Also, the improved heat stability attainable with calcium is, of course, not realized when the calcium is removed. Likewise, treatment with hydrogen zeolite, though substantially eliminating haze formation, results in a product of decreased heat stability. Other types of chemical treatment are also possible but are objectionable for similar reasons. In addition, since natural waters are subject to regional and seasonal fluctuations, the uncertainty regarding the varying objectionable calcium content of the water offers obvious processing difficulties. In view of the conflicting effects of the various metal ions, it has been a difficult problem to produce a highly purified chemical cellulose having high reactivity and stability, and from which organic acid esters having high heat stability and substantial freedom from haze could be made.

Now, in accordance with the present invention, an improved process has been discovered for producing a purified cellulose with improved characteristics. In the improved process of this invention, purified cellulose is subjected to a treatment whereby the calcium ion content of the cellulose is adjusted with respect to the content of a different metal ion, which results in retaining the beneficial effects of the calcium ion while neutralizing the adverse effects thereof.

In the present invention, an improved purified cellulose is prepared by a process in which purified cellulose is treated with a processing medium which has had its ionic content adjusted so that the thus treated cellulose contains adsorbed magnesium and calcium ions in a desired relationship. Chemical cellulose so treated has improved reactivity and stability and when manufactured into, for example, cellulose acetate by known acetylation methods, produces a product free of haze and possessing increased heat stability.

In the production of chemical cellulose or chemical cotton from cotton linters, the linters may be purified in any well-known manner as by a caustic soda boil and various acid and/or alkaline bleach treatments accompanied by one or more washes with water.

Now, in accordance with the present invention, the bleached linters may be treated with water containing the desired concentrations of calcium and magnesium ions. However, the incorporation of the ions with the cellulose may be accomplished by utilizing water with the desired ionic concentrations as the wash water.

This invention contemplates any process for adjusting the ion content of purified cellulose to the desired calcium and magnesium contents, in which the purified cellulose is treated with a processing water which has been treated in such a manner as to adjust its ionic content to within the required ranges.

Thus, according to one method of treatment, the processing or wash water is first subjected to any of the well-known water softening treatments as, for example, a hydrogen zeolite treatment, to remove calcium and sodium ions, and the softened water is then treated with a soluble magnesium salt to introduce 5–100 P. P. M. of magnesium. The resulting water is then used in the processing of the cotton linters to produce the desirable effects in accordance with the present invention.

According to another method the processing water comprising natural water containing calcium ions in any quantity up to about 100 P. P. M. and sodium ions is treated with a soluble magnesium salt. The increased magnesium ion concentration, by some physical or chemical mechanism not definitely understood, induces the desired stability and haze properties in the chemical cellulose processed therein without necessarily eliminating calcium and sodium.

According to a third method of treatment, the processing water, such as a natural water containing calcium and sodium, may be passed through a bed of zeolite mineral which has previously been regenerated with a magnesium salt instead of the sodium salt generally used for this purpose. The resulting water is quite suitable for the processing of chemical cellulose, producing a product of good haze and stability characteristics.

In accordance with a fourth method of treatment the processing water, such as a natural water containing an undesirably large amount of calcium as well as a satisfactorily high concentration of magnesium, may be treated with lime and/or soda ash in such a manner as to substantially reduce the calcium content without, at the same time, reducing the magnesium content by the same degree. This may be done preferably by a process wherein the water is treated with the treating chemicals in the presence of a slurry or sludge containing solid magnesium hydroxide and calcium carbonate to facilitate the operations of the process and more readily establish equilibrium conditions.

The chemical cellulose may be treated at any stage of the purification treatment and in any suitable manner. In the cases where the processing water either contains no magnesium to begin with or has been subjected to a treatment which removes substantially all of the magnesium dissolved therein, the magnesium may be added to the processing water prior to washing the chemical cellulose or it may be added to a slurry of the chemical cellulose in the processing water. Preferably, the magnesium is added in the final wash treatment as in this way there is less chance that a portion of the magnesium will be removed during the purification treatment. If desired, the magnesium may be added directly to the chemical cellulose in the form of a solution of a soluble salt of magnesium. In some cases, it may be desirable to add both calcium and magnesium for maximum stabilization. When this is done, the ratio of magnesium to calcium should be maintained within the limits to be pointed out hereinafter. Where magnesium is absorbed from an excess of processing water, it is desirable to maintain pH of the water above about 6.

The magnesium is added to the processing water or to the chemical cellulose in the form of water-soluble compounds. Salts such as magnesium sulfate, magnesium chloride, magnesium bromide, magnesium nitrate, etc., are suitable compounds, although in some cases compounds of only slight solubility such as the bicarbonate, carbonate, hydroxide, etc., may be used.

The amount of magnesium added will depend upon the conditions of treatment. Where the processing water or linters contain calcium, the magnesium should be added in an amount such that the resulting ratio of magnesium to calcium in the treating water and in the final product is not less than about 1 to 3 as ratios less than this tend to the formation of haze in the resulting organic acid ester. Preferably, the magnesium-calcium ratio is maintained at a value greater than 1 to 2.

Where the processing water is first chemically treated to remove calcium, as by hydrogen zeolite, the amount of magnesium added may vary from about 5 to about 100 parts per million based on the weight of the solution but is preferably maintained within the limits of about 10 to 100 parts per million to assure an effective treatment. In all cases, the magnesium will be present in a quantity to insure a ratio of adsorbed magnesium to adsorbed calcium in the final cellulose of not less than 1 to 3.

Where the processing water contains an undesirably large concentration of calcium and has a relatively high concentration of magnesium and the water is adjusted so as to have desirable concentrations with respect to both the calcium and magnesium ions, without requiring the addition of any magnesium ions, the calcium ion concentration will be reduced to below 100 parts per million, based on the weight of the solution, and the magnesium ion concentration maintained within the limits of about 5 to 100 parts per million. The magnesium concentration will be maintained at a value so that the ratio of magnesium to calcium ions in the solution is not less than 1 to 3.

The magnesium in the processing water used for treating the purified cellulose will be present in a quantity such that the cellulose after treatment contains magnesium in a quantity between about 0.001% and about 0.03% of the weight of the cellulose and in a ratio to any calcium present of at least 1 to 3. Calcium will be present in a quantity no more than 0.03% and may be absent; however, the usual quantity desired will be between 0.003% and 0.015%.

The following examples are given to illustrate the invention but should not be construed as limiting the scope thereof.

*Example 1*

Natural water containing 48 parts per million of calcium as $CaCO_3$ and 35 parts per million of sodium as $Na_2CO_3$ was mixed with chemical cellulose (purified cotton linters) to form a 2% slurry. Fifty parts per million magnesium sulfate, based on the weight of solution, were added to the slurry and the mixture agitated approximately 3 hours at atmospheric temperature and pressure, after which it was pumped to the driers without further treatment. The cellulose recovered from this water produced, on acetylation, haze-free solutions.

Chemical cellulose so treated yielded cellulose acetate dope solutions having haze values of 5–12 P. P. M. The cellulose itself, when subject to constant heating at 180° C. for 8 hours, gave heat test values of 8–9. In comparing these values with those of identical chemical cellulose processed with natural water alone, it was found that turbidities or haze values ranged 15–30 or more P. P. M. and heat stability values were in most cases 10–16, in some cases more.

*Example 2*

Natural water containing 350 and 180 P. P. M. (parts per million) of calcium and magnesium, respectively, expressed as calcium carbonate hardness (corresponding to about 140 P. P. M. and 45 P. P. M. of calcium and magnesium ions, respectively), was treated with lime and soda at a pH of 9.6–10.2 to give a water with a hardness of 10 P. P. M. of calcium ion and 40 P. P. M. of magnesium ion. The natural water with the excessive calcium content was treated with lime and soda ash in the presence of a slurry containing calcium carbonate and magnesium hydroxide and at a pH within the range 9.6–10.2. The lime and soda ash were supplied in amounts of about 2.1 and 0.50 pound, respectively, for each thousand gallons of the raw water treated. Purified chemical cellulose was washed and dried from this treated water in the usual manner.

The cellulose thus prepared, when subjected to constant heating at 180° C. for 8 hours gave heat test values of 7–8. The chemical cellulose yielded cellulose acetate dope solutions having haze values of 5-10 P. P. M. These values were compared with those of cellulose acetate made from identical chemical cellulose processed with the untreated natural water alone. It was found that turbidities or haze values in the latter case ranged 30-40 or more P. P. M.

This invention provides several advantages as compared to previously known methods. Thus, where processing water containing calcium salts has hitherto been used, the calcium has caused the formation of a haze in the organic acid ester made from the purified cellulose. Where it was attempted to remove the calcium by treatment with sodium zeolite, the sodium had an adverse effect on reactivity of the purified cellulose and stability of the organic acid ester. Treatment with hydrogen zeolite, though eliminating haze to a large extent, likewise resulted in poorer stabilities. Treatment with magnesium and/or adjustment of the calcium and magnesium concentrations in accordance with the present invention overcomes these difficulties and produces an improved product of increased reactivity and stability and from which an organic acid ester, such as cellulose acetate, cellulose acetate-propionate, cellulose acetate-butyrate, etc., free of haze and of increased stability may be made. When the magnesium is added to a processing water containing calcium, or when a water with a large calcium concentration and also containing a satisfactory amount (5-100 P. P. M.) of dissolved magnesium ion is treated to decrease the calcium content to a desirable value without removing too much of the magnesium, the haze-forming characteristics of the calcium are sufficiently diminished and/or counteracted while the beneficial effects of calcium on stability are retained.

Water containing calcium may be treated by several processes in order to produce a satisfactory processing water for treating purified linters in accordance with the present invention, depending upon the characteristics of the water. For example, a water containing less than 100 P. P. M. of dissolved calcium and either containing substantially no magnesium or containing less than ⅓ as much magnesium as calcium, may be adjusted simply by adding the required amount of a suitable magnesium compound. For a water that is similar to the above water except that it contains more than 100 P. P. M. of dissolved calcium, the excess of dissolved calcium may be first removed, and then the magnesium compound added or at least the desired amount of calcium in the water may be removed and simultaneously replaced by a stoichiometrically equivalent amount of magnesium. This latter method may be carried out by flowing the calcium containing water over and/or through a cation-exchanging material which had been treated previously with a magnesium salt. But, a water which contains an undesirably large content of calcium and also contains at least a potentially sufficient amount of magnesium may be treated in two types of ways. In the first place, the water may be treated in such a way as to remove substantially all of both the calcium and the magnesium and then the required amount of a suitable magnesium compound added. In the second place, the water may be treated in such a way as to reduce the calcium to a satisfactory value with or without reducing the magnesium content. Thus, it may not be necessary actually to add any magnesium to the water.

A preferred method of treating a water containing more than the desired concentration of dissolved calcium and containing at least sufficient dissolved magnesium to be used in accordance with the present invention is to add lime, with or without soda ash, depending upon the requirements for pH control and precipitation of magnesium as magnesium hydroxide, to a slurry of precipitated calcium carbonate and magnesium hydroxide with, generally, a small amount of a coagulant such as alum (or resultant aluminum hydroxide). The water to be treated is then contacted with this treating slurry, with agitation. By flowing the raw water into the slurry at the bottom and causing it to rise through the slurry, a satisfactory effluent water may be withdrawn from above the upper surface of the slurry. By this method equilibrium conditions are established quickly and by suitable adjustments in the proportion of reagents, with consequent adjustment of the pH of the solution, either both the calcium and magnesium concentrations may be reduced and adjusted to suitable predetermined values or the calcium may be substantially selectively removed without affecting appreciably the magnesium concentration.

Reactivity, as used in this specification, is that characteristic of the purified cellulose by virtue of which it esterifies; i. e., acetylates, smoothly into a dope which is free from unesterified fibers and easily filtered.

Stability is that characteristic of the purified cellulose and the organic acid ester made therefrom by virtue of which the materials are less susceptible to decomposition, particularly by heat. This factor may be determined by heating cotton linters at 180° C. for 8.0 hours and comparing the decomposition (color developed) with samples of known good stability which have been heated for varying lengths of time. The higher the numerical value, the lower the heat stability. Thus, a heat stability of 8 is very good, while 12-14 is average, and 15 or above is considered poor.

Haze formation is evidenced by a smoky or cloudy appearance of the esterification; i. e., acetylation, dope or the organic acid ester and is thought by some to be caused by the formation of a colloidal precipitate. Regardless of the theoretical explanation of haze formation, the use of the present invention substantially eliminates this objectionable condition. Where turbidity or haze values are referred to herein, these values are obtained by determining the turbidity of a cellulose ester dope or solution by means of a Betz-Hellige Turbidimeter, which is described in Industrial and Engineering Chemistry, Analytical edition, 7, No. 4, page 262, (1935), expressing the haze on the basis of equivalent parts per million of barium sulfate.

It will be understood that the details and examples hereinbefore set forth are illustrative only, and that the invention as broadly described and claimed is in no way limited thereby.

This application is a continuation-in-part of my copending application for United States Letters Patent, Serial Number 398,981, filed June 20, 1941.

What I claim and desire to protect by Letters Patent is:

1. In the preparation of cellulose in a form suitable for esterification to an ester of a lower fatty acid of improved heat stability and haze characteristic, a process which comprises removing dissolved calcium from a processing water containing more than 100 P. P. M. of dissolved calcium and from about 5 P. P. M. to about 100 P. P. M. of dissolved magnesium, until the water contains less than 100 P. P. M. of dissolved calcium and at least ⅓ as much magnesium as calcium, and treating purified cellulose with the resulting water to incorporate therein a quantity of magnesium between about 0.001% and about 0.03% by weight of the cellulose.

2. In the preparation of cellulose in a form suitable for esterification to an ester of a lower fatty acid of improved heat stability and haze characteristic, a process which comprises removing dissolved calcium from a processing water containing more than 100 P. P. M. of dissolved calcium and from about 5 P. P. M. to about 100 P. P. M. of dissolved magnesium, until the water contains less than 100 P. P. M. of dissolved calcium and at least ⅓ as much magnesium as calcium, and treating purified cotton linters with the resulting water to incorporate therein a quantity of magnesium between about 0.001% and about 0.03% by weight of the cotton linters.

3. In the preparation of cellulose suitable for esterification to an ester of improved haze characteristic, a process which comprises treating a processing water containing substantially more than 100 P. P. M. of dissolved calcium and more than about 10 P. P. M. of dissolved magnesium to remove a portion of the dissolved calcium to produce a processing water containing not more than about 100 P. P. M. of dissolved calcium and an amount of magnesium which is at least 5 P. P. M. and is at least ⅓ of the amount of calcium, and treating purified cellulose with the resulting water to incorporate therein a quantity of magnesium between about 0.001% and about 0.03% by weight of the cellulose.

4. In the preparation of cellulose suitable for esterification to an ester of improved haze characteristic, a process which comprises treating a processing water containing substantially more than 100 P. P. M. of dissolved calcium and more than about 10 P. P. M. of dissolved magnesium to remove a portion of the dissolved calcium to produce a processing water containing not more than about 100 P. P. M. of dissolved calcium and an amount of magnesium which is at least 5 P. P. M. and is at least ⅓ of the amount of calcium, and treating purified cotton linters with the resulting water to incorporate therein a quantity of magnesium between about 0.001% and about 0.03% by weight of the cotton linters.

5. In the preparation of a lower fatty acid ester of cellulose which is characterized by improved heat stability and haze-forming characteristics, a process which comprises removing dissolved calcium from a processing water containing more than about 100 P. P. M. of dissolved calcium and from about 5 P. P. M. to about 100 P. P. M. of dissolved magnesium, until the water contains less than 100 P. P. M. of dissolved calcium and at least ⅓ as much magnesium as calcium, treating purified cellulose with the resulting solution, removing the water from the treated cellulose, and esterifying the treated cellulose with a lower fatty acid to form a stable, substantially haze-free lower fatty acid ester of cellulose.

6. In the preparation of a lower fatty acid ester of cellulose which is characterized by improved heat stability and haze-forming characteristics, a process which comprises treating a processing water containing substantially more than 100 P. P. M. of dissolved calcium and more than about 10 P. P. M. of dissolved magnesium to remove a portion of the dissolved calcium to produce a processing water containing not more than about 100 P. P. M. of dissolved calcium and an amount of magnesium which is at least 5 P. P. M. and is at least ⅓ of the amount of calcium, treating purified cellulose with the resulting solution, removing the water from the treated cellulose, and esterifying the treated cellulose with a lower fatty acid to form a stable, substantially haze-free lower fatty acid ester of cellulose.

ROBERT B. DARLING.